United States Patent Office 3,294,415
Patented Dec. 27, 1966

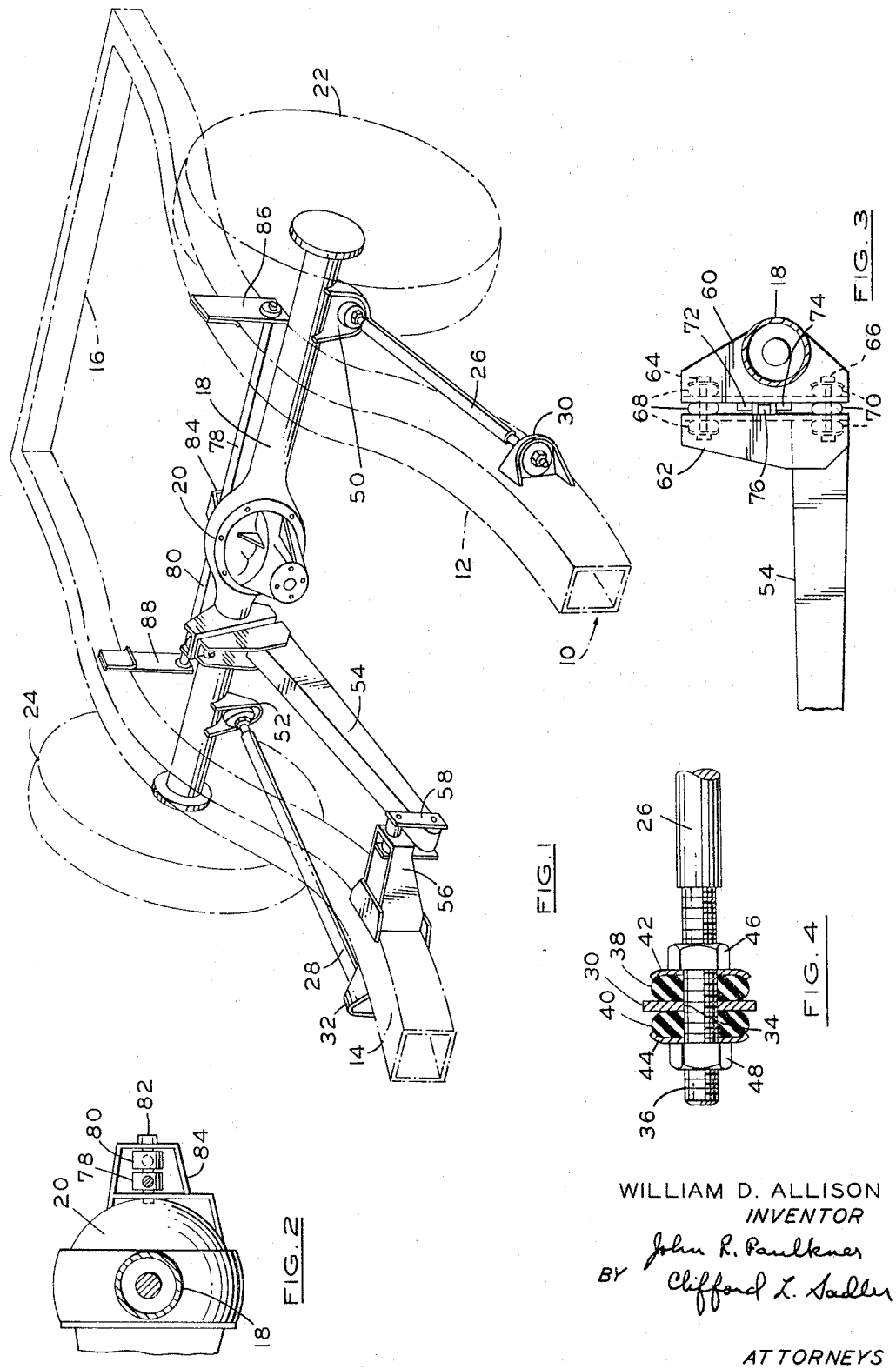

3,294,415
LINKAGE TYPE REAR SUSPENSION SYSTEM FOR A MOTOR VEHICLE
William D. Allison, Grosse Pointe Farms, Mich., assignor to Ford Motor Company, Dearborn, Mich., a corporation of Delaware
Filed Dec. 18, 1964, Ser. No. 419,481
3 Claims. (Cl. 280—124)

The present invention is generally related to rear suspension systems for motor vehicles, and more particularly to a rear suspension system of the linkage type.

It is the basic object of any motor vehicle suspension system to resiliently support the vehicle body upon the wheels and to isolate road irregularities from the passenger compartment. In addition, a superior vehicle suspension system should provide a soft boulevard ride, have good road holding qualities while cornering, and isolate noise and vibration from the vehicle body.

These features are not always compatible. In a conventional suspension structure, a soft ride usually leads to instability at high vehicle speeds or loss of precise cornering control. Similarly, a suspension system having exceptional vehicle control characteristics is usually accompanied by a harsh ride.

Therefore, it is the principal object of the present invention to provide a superior vehicle suspension system of the linkage type which combines these desirable operating characteristics.

It is a further object of the present invention to provide a rear suspension system that is so arranged that when a side force is applied to the sprung mass, the rear of the vehicle is displaced sideways relative to the rear axle. This lateral displacement is known in the art as lateral compliance. Lateral compliance is desirable because it reduces ride harshness and side shake.

It is another object of the present invention to provide a pair of suspension arms or links that extend forwardly and outwardly in a diverging relationship from the axle housing to their attachment with the body so that lateral displacement of the body is accompanied by a canting of the axle in the direction of understeer.

It is still another object of the invention to provide a torque arm which interconnects the axle housing and the vehicle body. In accordance with the preferred embodiment of the present invention, the torque arm is connected to the axle housing by a resilient means which permits lateral displacement of the body relative to the axle. The torque arm prevents rotation of the axle during acceleration and braking. In a suspension of the present invention, the torque reaction is handled solely by the torque arm and is isolated from the other suspension arms and links.

Another object of the present invention is to connect the forward end of the torque arm to the vehicle body by a shackle device so that the torque arm cannot be loaded in either compression or tension during acceleration and braking. The diverging suspension arms carry all of the braking and accelerating forces while the torque arm acts as the sole torque reaction member to prevent rotation of the axle housing.

The many objects and advantages of the present invention will become amply apparent from the following discussion and the accompanying drawings, in which:

FIGURE 1 is a perspective view of a rear suspension system for a motor vehicle constructed in accordance with the present invention;

FIGURE 2 is a side elevational view of the attachment of the lateral links to the differential housing;

FIGURE 3 is a side elevational view of the attachment of a torque arm to the axle housing; and FIGURE 4 is an elevational view partly in section of the attachment of one of the suspension links to the chassis frame.

Referring now to the drawings, wherein the presently preferred embodiment is disclosed, FIGURE 1 illustrates a rear suspension for a motor vehicle incorporating the present invention. A vehicle frame 10 has left and right frame side rails 12 and 14 that are interconnected at their rear end by a frame cross member 16. An axle housing 18 has a centrally situated differential housing 20 which contains differential gearing. The differential gearing receives power from an engine and distributes it through axle shafts contained within the housing 18 to the left and right road wheels 22 and 24.

Suspension means are provided to connect the axle housing 18 with the vehicle frame 10. In accordance with the present invention, such means includes left and right suspension links 26 and 28 which have their forward ends connected to frame brackets 30 and 32. The suspension links 26 and 28 are arranged in a generally forwardly and outwardly diverging relationship.

FIGURE 4 illustrates the nature of the connection between the end of the suspension link 26 and the frame bracket 30. The bracket 30 is provided with a central hole 34 through which the threaded end 36 of the link 26 is received. A pair of rubber elements 38 and 40 are positioned on either side of the bracket 30. The rubber elements 38 and 40 are held in place by a pair of concave washers 42 and 44 which are secured by nuts 46 and 48. This construction provides a simplified pivotal connection between the links 26 and the bracket 30. The connection permits the link 26 to pivot laterally as well as in jounce and rebound. Due to the presence of the rubber elements 38 and 40, noise and vibration associated with the axle 18 are isolated from the frame side rail 12. A similar construction is used for connecting the forward end of the right-hand link 28 to the frame bracket 32.

A pair of brackets 50 and 52 depend from the axle housing 18. The rear ends of the left and right suspension links 26 and 28 are connected to the brackets 50 and 52 by means of rubber bushings similar to the construction illustrated in FIGURE 4.

A torque arm 54 also interconnects the axle housing and the frame 10. The right frame rail 14 has a bracket 56 welded to it which, in turn, pivotally supports a shackle device 58. The lower end of the shackle device 58 is pivotally connected to the torque arm 54.

A bracket 60 is welded to the axle housing 18 and is connected to the rear end of the torque arm 54. The torque arm 54 has an upstanding bracket 62 welded to it which presents a face in abutting relationship to the axle housing bracket 60. A pair of bolts 64 and 66 interconnect the brackets 60 and 62. These brackets 60, 62 are isolated by rubber elements 68 and 70 which are positioned about the connecting bolts 64 and 66. Due to the presence of the rubber element 68 and 70, slight pivotal movement about a vertical axis is permitted between the bracket 62 of the torque arm 54 and the bracket 60 of the axle housing.

In order to prevent vertical displacement of the brackets 60 and 62, the bracket 60 is provided with a pair of spaced apart teeth 72 and 74. The torque arm bracket 62 is similarly provided with a tooth 76 which is positioned between the teeth 72 and 74. Rubber elements 77 are interposed between the teeth 72, 74 and 76. This construction restricts vertical displacement between the brackets 60 and 62.

With the suspension thus far described, the axle housing 18 is positioned longitudinally of the frame side rails 12 and 14 by the suspension links 26 and 28. The axle housing 18 is free to shift laterally relative to the frame due to the nature of the pivotal connections at the ends of the links 26 and 28 and the torque arm 54. In accordance with the present invention, means are provided for resiliently restricting lateral axle movement. Such means comprise a pair of lateral links 78 and 80 which have a pivotal connection at their inner ends with a pivot bolt 82 that is secured to the rear end of the differential housing 20. The pivot pin 82 is supported by a bracket 84 which is welded to the backside of the housing 20. The outer ends of the lateral links 78 and 80 are pivotally connected to vertically extending leaf spring members 86 and 88. The upper ends of the leaf spring members 86 and 88 are secured to the frame side rails 12 and 14, respectively. This construction controls the lateral position of the axle housing 18 with respect to the frame 10 and due to the resilience of the vertically extending leaf spring elements 86 and 88, permits slight lateral resilient movement of the axle housing 18.

The frame 10 is supported on the axle housing 18 by a pair of coil springs which are positioned one adjacent each of the wheels 22 and 24. The springs are not shown in the drawing in order to simplify the illustration.

The rear suspension is arranged so that when a side force is applied to the sprung mass, the rear of the vehicle body is displaced sideways relative to the rear axle 18. This lateral displacement is permitted by the resilient flexibility of the spring metal links 86 and 88 which interconnect the axle housing and the frame. Since the front of the body does not move laterally, the body undergoes angular rotation about a vertical axis through the center of the front tread. Each point on the sprung mass rotates about this axis in proportion to its distance from the axis and the amount of lateral displacement or compliance at the rear suspension.

This lateral displacement of the sprung mass at the rear axle is utilized to effect a steering movement of the rear axle 18 in a direction to oppose the side force. The steering of the rear axle 18 is accomplished by the angular placement of the two suspension links 26, 28 connecting the axle 18 to the frame 10. As the frame pivots 30, 32 of the suspension links 26, 28 rotate around the vertical front axis, the pivot on one side of the car goes forward and out and the opposite pivot moves in and rearwardly relative to the center of the rear axle 18. The fixed length of each of the suspension links 26 and 28 imparts a steering movement to the rear axle 18 according to the spacing and angular positions of the links 26, 28.

Inasmuch as the steering movement applied to the rear axle 18 is in a direction to oppose the side force, it is considered to be in the direction of understeer. The understeering produced by lateral compliance is proportional to the lateral force and is not appreciably effective by vehicle ride height in contrast to the pronounced effect of ride height on the rear axle steer produced by body roll.

It will be noted from the drawings that the suspension links 26 and 28 are angled with respect to each other in a forwardly diverging fashion. With this arrangement, side thrust understeer is provided. When the vehicle having the suspension in FIGURE 1 is executing a turn to the left, the vehicle frame and body will tend to shift to the right under the influence of centrifugal force. This lateral shift will be permitted due to flexibility of the link supports 86 and 88. When the body and frame 10 shifts to the right, the left-hand link 26 will become more generally parallel to the longitudinal axis of the vehicle. This will cause the left wheel 22 to move slightly rearwardly as the left link 26 tends to straighten out in its direction. At the same time, right link 28 will become arranged at a sharper angle to the axle housing 18 when the chassis shifts to the right. This movement of the right link 28 will tend to pull the right wheel 24 forwardly. Because the left wheel 28 is moved rearwardly and the right wheel 24 is moved forwardly, the wheels will tend to steer the vehicle out of the curve which produced the centrifugal force. This is known as understeer. Because the understeer is responsive to a side force, it is called side thrust understeer.

It is generally recognized by those skilled in the art that side thrust understeer increases the controllability of the vehicle during cornering. It generally provides an increase in the preciseness of the steering.

In addition to providing a means of obtaining rear suspension understeering that is insensitive to ride height, lateral compliance provides other benefits in the forms of increased road holding on corners and a reduction in side shake. In a solid axle rear suspension system, individual vertical movement of either rear wheel imparts a sideways push to the sprung mass at the roll center. The application of lateral forces to the body produces noise, vibration and side shake. Lateral compliance or flexibility between the sprung mass and the rear axle permits the axle to follow road irregularities with a substantial reduction in the magnitude of lateral forces between the body and axle in comparison with the conventional rear suspension. The net effect on the body is a pronounced reduction in noise, vibration and harshness. The net effect on the axle is a greatly increased traction on corners due to the diminished peak side forces applied to the tires.

The torque arm 54 is connected at each of its ends by means which permit the lateral movement between the frame 10 and the axle 18. The shackle connection 58 permits the right end of the axle housing 18' to move forwardly or rearwardly as dictated by the side thrust understeer geometry of the suspension. The shackle 58 transfers brake and acceleration reaction forces which tend to rotate the axle housing 18 from that housing to the frame 10 and, thus permits the arm 54 to function as a torque arm.

Longitudinal forces on the axle housing 18 that are caused by acceleration and braking are handled by the suspension links 26 and 28. Because the shackle 58 permits longitudinal displacement of the torque arm 54, these forces are not carried by that arm.

The foregoing description constitutes the presently preferred embodiment of this invention. Modifications and alterations may occur to those skilled in the art which will come within the scope and spirit of the following claims.

I claim:

1. A vehicle suspension system having a vehicle frame, an axle housing, and suspension means constructed to connect said vehicle frame to said axle housing, said suspension means comprising a pair of suspension links each having a universal pivotal connection at one of their ends with said frame and a universal pivotal connection at their other ends with said axle housing, said suspension links being arranged in a forwardly and outwardly diverging manner, transverse link means resiliently positioning said axle housing with respect to said frame, said link means comprising a pair of links each having their inner ends pivotally connected to said axle housing and their outer ends connected to vertically extending laterally resilient leaf springs, said leaf springs being secured to said frame, a torque arm constructed to transfer brake and acceleration torque from said axle housing to said frame, a pair of spaced apart resilient connection means joining said torque arm to said axle housing, shackle means interconnecting one end of said torque arm and said frame, said suspension means permitting said vehicle frame to move laterally with respect to said axle housing whereby one end of said axle housing is moved forwardly and the other end of said axle housing is moved rearwardly to provide an understeer effect.

2. A vehicle suspension system having a vehicle frame, an axle housing, and suspension means constructed to connect said vehicle frame to said axle housing, said suspension means comprising a pair of suspension links each having a pivotal connection at one of their ends with said frame and a pivotal connection at their other ends with said axle housing, said suspension links being arranged in a forwardly and outwardly diverging manner, transverse link means resiliently positioning said axle housing with respect to said frame, said link means comprising a pair of links each having their inner ends pivotally connected to said axle housing and their outer ends connected to vertically extending laterally resilient leaf springs, said leaf springs being secured to said frame, a torque arm constructed to transfer brake and acceleration torque reaction from said axle housing to said frame, resilient connection means joining said torque arm to said axle housing, means interconnecting one end of said torque arm and said frame, said just mentioned means being constructed to prevent substantial vertical movement of said one end of said torque arm with respect to said frame while permitting fore and aft displacement of said one end, said suspension means permitting said vehicle frame to move laterally with respect to said axle housing whereby one end of said axle housing is moved forwardly and the other end of said axle housing is moved rearwardly to provide an understeer effect.

3. A vehicle suspension system having a vehicle frame, an axle housing, and suspension means constructed to connect said vehicle frame to said axle housing, said suspension means comprising a pair of suspension links each having a pivotal connection at one of their ends with said frame and a pivotal connection at their other ends with said axle housing, transverse link means resiliently positioning said axle housing with respect to said frame, said link means comprising a pair of links each having their inner ends pivotally connected to said axle housing and their outer ends connected to vertically extending laterally resilient leaf springs, said leaf springs being secured to said frame, a torque arm constructed to transfer brake and acceleration torque reaction from said axle housing to said frame, a pair of spaced apart resilient connection means joining said torque arm to said axle housing, shackle means interconnecting one end of said torque arm and said frame, said suspension means permitting said vehicle frame to move laterally with respect to said axle housing whereby one end of said axle housing is moved forwardly and the other end of said axle housing is moved rearwardly to provide a steering effect.

References Cited by the Examiner

UNITED STATES PATENTS

| | | | |
|---|---|---|---|
| 2,300,844 | 11/1942 | Olley | 180—73 |
| 2,998,265 | 8/1961 | Kozicki | 180—73 X |
| 3,193,303 | 7/1965 | Allison et al. | 267—67 |

FOREIGN PATENTS

| | | |
|---|---|---|
| 1,218,533 | 12/1959 | France. |
| 765,682 | 6/1953 | Germany. |
| 938,892 | 2/1956 | Germany. |

BENJAMIN HERSH, *Primary Examiner.*

LEO FRIAGLIA, *Examiner.*

W. A. MARCONTELL, M. S. SALES,
*Assistant Examiners.*